(12) United States Patent
Kato

(10) Patent No.: US 9,021,555 B2
(45) Date of Patent: *Apr. 28, 2015

(54) APPARATUS, METHOD, AND PROGRAM FOR VALIDATING USER

(71) Applicant: The Bank of Tokyo-Mitsubishi UFJ, Ltd., Tokyo (JP)

(72) Inventor: Takaya Kato, Tokyo (JP)

(73) Assignee: The Bank of Tokyo-Mitsubishi UFJ, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/679,401

(22) Filed: Nov. 16, 2012

(65) Prior Publication Data
US 2013/0081107 A1    Mar. 28, 2013

Related U.S. Application Data

(63) Continuation of application No. 11/886,902, filed as application No. PCT/JP2006/306501 on Mar. 29, 2006, now Pat. No. 8,347,368.

(51) Int. Cl.
| H04L 29/06 | (2006.01) |
| G06F 21/31 | (2013.01) |
| G06F 21/34 | (2013.01) |

(52) U.S. Cl.
CPC .............. H04L 63/08 (2013.01); G06F 21/31 (2013.01); G06F 21/34 (2013.01);
(Continued)

(58) Field of Classification Search
USPC .......................................................... 726/3
See application file for complete search history.

(56) References Cited

U.S. PATENT DOCUMENTS 6,310,889 B1    10/2001  Parsons et al.
7,472,413 B1 *  12/2008  Mowshowitz .................. 726/10
(Continued)

FOREIGN PATENT DOCUMENTS

JP   A-2000-209284    7/2000
JP   A-2001-325229    11/2001
(Continued)

OTHER PUBLICATIONS

Computer Security—ESORICS 2009 Lecture Notes in Computer Science vol. 5789, 2009, pp. 390-405 Model-Checking DoS Amplification for VoIP Session Initiation Ravinder Shankesi, Musab AlTurki, Ralf Sasse, Carl A. Gunter, José Meseguer.*

(Continued)

*Primary Examiner* — Harris Wang
(74) *Attorney, Agent, or Firm* — Oliff PLC

(57) ABSTRACT

User validation accuracy is improved without inconveniencing a user. When an authentication request packet is received from a terminal and the authentication is successful based on a user ID and a password, an HTTP header, user-agent information, and access source IP address are extracted from the packet, and user authentication is performed by verifying the IP address and the user-agent information against usage history information where at most two sets of the IP address and the user-agent information extracted from the authentication request packet which is received from the same user previously are registered. When the set of the IP address and the UA information corresponding to the new extracted IP address and the new extracted UA information is registered in the usage history information, the authentication is successful, and the usage history information is overwritten with the new IP address and the new UA information.

3 Claims, 8 Drawing Sheets

(52) U.S. Cl.
CPC .............. *G06F 2221/2101* (2013.01); *G06F 2221/2111* (2013.01); *H04L 63/083* (2013.01); *H04L 63/101* (2013.01); *H04L 63/126* (2013.01); *H04L 63/168* (2013.01); *H04L 2463/082* (2013.01)

(56) References Cited

U.S. PATENT DOCUMENTS

| | | | |
|---|---|---|---|
| 7,941,550 B1* | 5/2011 | Smith et al. | 709/228 |
| 8,230,490 B2* | 7/2012 | Zapata et al. | 726/9 |
| 8,490,173 B2* | 7/2013 | Komura et al. | 726/13 |
| 8,849,988 B2* | 9/2014 | Mutnuru et al. | 709/224 |
| 2002/0032781 A1* | 3/2002 | Yoshida et al. | 709/228 |
| 2002/0083178 A1* | 6/2002 | Brothers | 709/226 |
| 2003/0033356 A1* | 2/2003 | Tran et al. | 709/203 |
| 2004/0230825 A1* | 11/2004 | Shepherd et al. | 713/200 |
| 2005/0022000 A1* | 1/2005 | Inomata et al. | 713/200 |
| 2005/0187890 A1* | 8/2005 | Sullivan | 707/1 |
| 2005/0262026 A1* | 11/2005 | Watkins | 705/67 |
| 2006/0021004 A1* | 1/2006 | Moran et al. | 726/2 |
| 2006/0123226 A1* | 6/2006 | Kumar et al. | 713/154 |
| 2006/0156389 A1* | 7/2006 | Brown et al. | 726/5 |
| 2006/0282660 A1* | 12/2006 | Varghese et al. | 713/155 |
| 2007/0239606 A1* | 10/2007 | Eisen | 705/51 |
| 2009/0034521 A1* | 2/2009 | Kato | 370/389 |

FOREIGN PATENT DOCUMENTS

| | | |
|---|---|---|
| JP | A-2004-236105 | 8/2004 |
| JP | A-2005-044277 | 2/2005 |
| WO | WO 03/029971 A1 | 4/2003 |
| WO | WO 03/034633 A2 | 4/2003 |

OTHER PUBLICATIONS

Source address validation based Ethernet switches for IPv6 network, Hu Jinlong ; Wu Yisheng Computer Science and Automation Engineering (CSAE), 2012 IEEE International Conference on Publication Year: 2012 , pp. 84-87.*
Mar. 20, 2013 Office Action issued in U.S. Appl. No. 13/445,678.
Jan. 7, 2014 Office Action issued in U.S. Appl. No. 13/445,678.
Sep. 30, 2013 Office Action issued in U.S Appl. No. 13/445,678.
Otani, Syuusaku, "ITpro Mobile Phone on Business, Specifying Terminal to Prevent Illegal Access, First Part," [online], Jul. 8, 2004 Nikkei BP [Search date Jul. 20, 2006], Internet Site <URL; http://itpro.nikkeibp.co.jp/free/TIS/keitai/20040706/146863/?ST=print>.
Extended European Search Report issued Apr. 19, 2011 in European counterpart application No. EP 06 73 0449.
Aug. 1, 2006 International Search Report issued in International Patent Application No. PCT/JP2006/306501.
U.S. Appl. No. 13/445,678.
European Search Report dated Jul. 30, 2012 issued in European Patent Application No. 12174044.3.
Jul. 14, 2014 Office Action issued in U.S. Appl. No. 13/445,678.

* cited by examiner

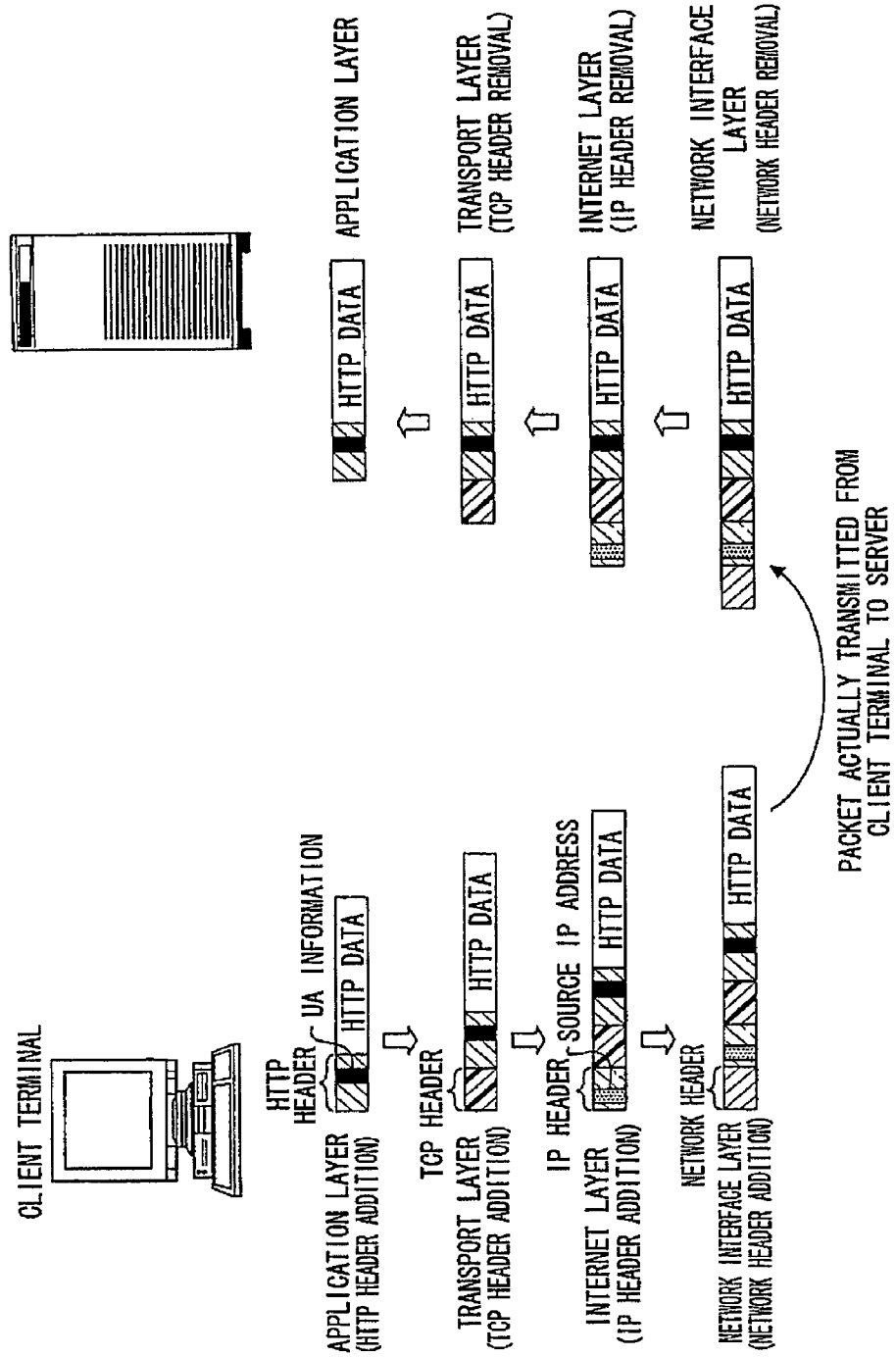

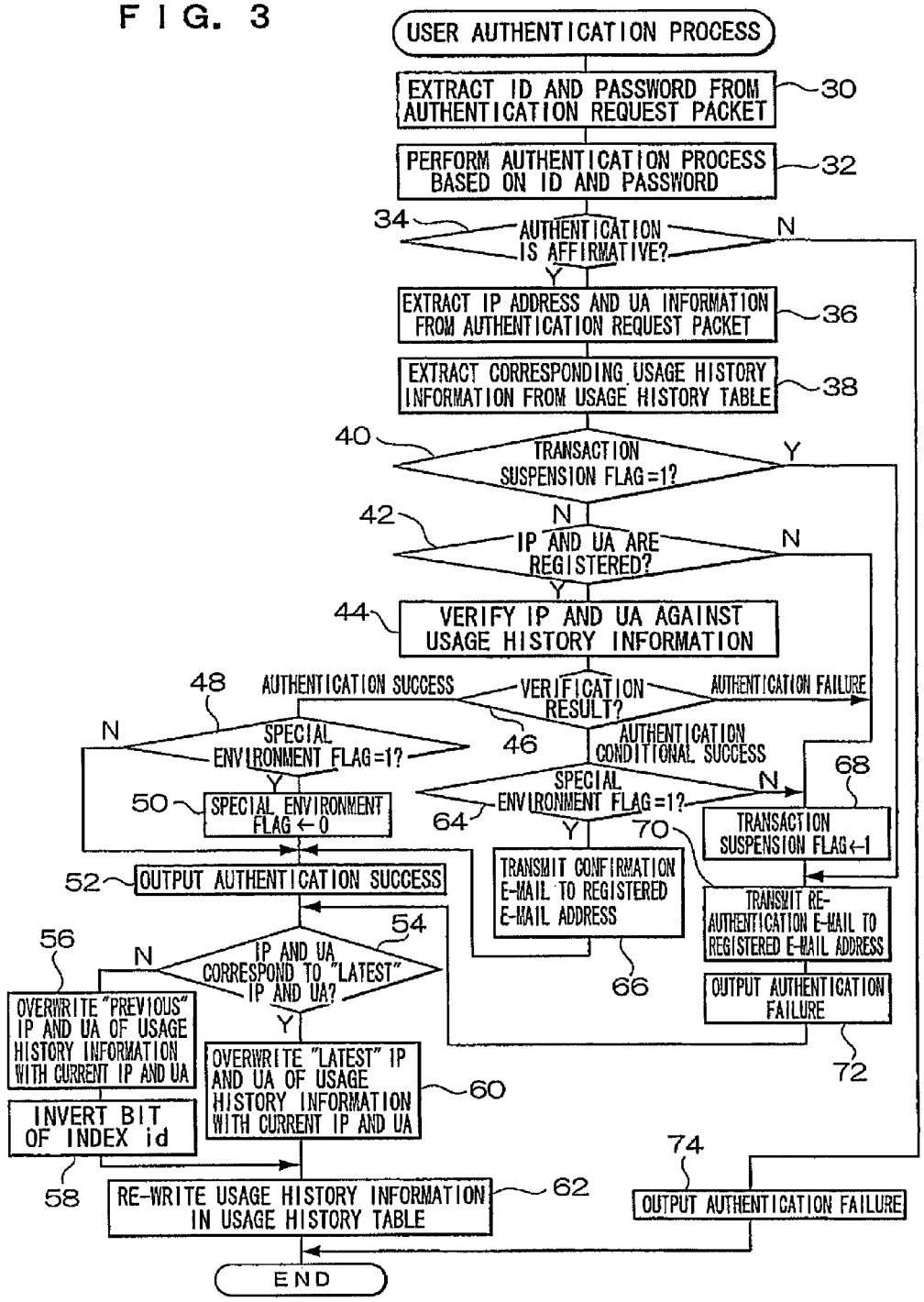

F I G. 4

⟨CONTENTS OF USAGE HISTORY INFORMATION⟩

| CUSTOMER ID | TRANSACTION SUSPENSION FLAG | SPECIAL ENVIRONMENT FLAG | VERIFICATION DETERMINATION THRESHOLD | id | IP0 | UA0 | IP1 | UA1 |
|---|---|---|---|---|---|---|---|---|

CUSTOMER ID (FIXED VALUE) : GENERATED FROM CUSTOMER MASTER WITH HASH FUNCTION

TRANSACTION SUSPENSION FLAG: SET "INVALID (1)" IN THE CASE OF AUTHENTICATION FAILURE, AND AUTHENTICATION IN NORMAL ROUTE FAILS

SPECIAL ENVIRONMENT FLAG : SET (1) IN THE CASE OF RE-AUTHENTICATION SUCCESS IN ANOTHER ROOT, AND AUTHENTICATION ON "CONDITIONAL SUCCESS" SUCCESSES

VERIFICATION DETERMINATION THRESHOLD : THRESHOLD OF DEGREE OF COINCIDENCE (FOR EXAMPLE, ABOUT 80% IN DEFAULT) USED IN IP ADDRESS VERIFICATION

INDEX (id) : INDICATING IN ONE BIT WHICH IP0 AND UA0 OR IP1 AND UA1 IS THE LATEST

IP/UA : TWO SETS OF "LATEST" AND "PREVIOUS" IP ADDRESS/USER-AGENT INFORMATION ARE STORED

F I G. 5

<CRITERION FOR AUTHENTICATION SUCCESS/FAILURE BASED ON THE USAGE HISTORY INFORMATION>

| | | VERIFICATION RESULT WITH "PREVIOUS" IP AND UA | | | |
|---|---|---|---|---|---|
| | | IP=OK, UA=OK | IP=OK, UA=x | IP=x, UA=OK | IP=x, UA=x |
| VERIFICATION RESULT WITH "LATEST" IP AND UA | IP=OK, UA=OK | AUTHENTICATION SUCCESS | AUTHENTICATION SUCCESS | AUTHENTICATION SUCCESS | AUTHENTICATION SUCCESS |
| | IP=OK, UA=x | AUTHENTICATION SUCCESS | AUTHENTICATION CONDITIONAL SUCCESS | AUTHENTICATION FAILURE | AUTHENTICATION FAILURE |
| | IP=x, UA=OK | AUTHENTICATION SUCCESS | AUTHENTICATION FAILURE | AUTHENTICATION CONDITIONAL SUCCESS | AUTHENTICATION FAILURE |
| | IP=x, UA=x | AUTHENTICATION SUCCESS | AUTHENTICATION FAILURE | AUTHENTICATION FAILURE | AUTHENTICATION FAILURE |

IP = OK: DEGREE OF COINCIDENCE BETWEEN IP ADDRESSES IS EQUAL TO OR HIGHER THAN PREDETERMINED VALUE

IP = x : DEGREE OF COINCIDENCE BETWEEN IP ADDRESSES IS LOWER THAN PREDETERMINED VALUE

UA = OK: PIECES OF UA INFORMATION ARE VERIFIED AGAINST EACH OTHER

UA = x : PIECES OF UA INFORMATION ARE NOT VERIFIED AGAINST EACH OTHER

APPARATUS, METHOD, AND PROGRAM FOR VALIDATING USER

This is a Continuation of application Ser. No. 11/886,902 filed Sep. 21, 2007, which in turn is a National Phase of Application No. PCT/JP2006/306501 filed Mar. 29, 2006. The disclosures of the prior applications are hereby incorporated by reference herein in their entireties.

TECHNICAL FIELD

The present invention relates to an apparatus, a method, and a program for validating a user, particularly to a user validation apparatus for validating whether or not a user operating a terminal device is a valid user, a user validation method which can be applied to the user validation apparatus, and a user validation program which causes a computer to act as the user validation apparatus.

BACKGROUND ART

Generally a user validation method is adopted in a web site which provides predetermined online service to users who have registered in advance, wherein, a user who accesses the web site through a terminal device is caused to input a user ID and a password, and a confirmation whether or not the user who is accessing the web site is a valid user is made based on whether or not a combination of the inputted user ID and password is registered. However, in the case that the user ID and the password are leaked to another person, the above user validation method is disadvantageous because the person who knows the user ID and the password can illegally access the web site while disguising their identity as that of a valid user.

For example, Japanese Patent Application Laid-Open (JP-A) No. 2000-209284 discloses a technique of performing user authentication by determining whether or not, in addition to the user ID and the password, a telephone number of a caller received from a telephone exchange is verified against a telephone number of a telephone line which is used by a registered user.

Japanese Patent Application Laid-Open (JP-A) No. 2001-325229 discloses a technique, wherein an IP address (and link source URL) with which the usage of service is permitted is stored in a database along with ID and password and a determination whether or not the usage of service is pet is made, in addition to determination with the ID and password, by determining whether or not the access source IP address is registered in the database (and when the link source URL exists in an access signal, by determining whether or not the link source URL is registered in the database).

DISCLOSURE OF THE INVENTION

Problem to be Solved by the Invention

In the techniques disclosed in Japanese Patent Application Laid-Open (JP-A) Nos. 2000-209284 and 2001-325229, the confirmation whether or not the user who is operating the terminal device of the access source is a valid user (whether or not a third party disguises its identity as that of a valid user) is made by determining whether or not the terminal device of the access source is a valid terminal device by using the telephone number or the IP address. Although the technique disclosed in Japanese Patent Application Laid-Open (JP-A) No. 2000-209284 has an advantage that the terminal device can uniquely be specified by using the telephone number, the technique has a problem in that the technique cannot be applied to other devices except for the terminal device connected to a network through the telephone exchange.

Although the IP address used in the technique disclosed in Japanese Patent Application Laid-Open (JP-A) No. 2001-325229 is always kept fixed in the terminal device to which a global IP address is fixedly imparted, few terminal devices have such fixedly imparted global IP address, and in most terminal devices, the IP address is different in each access because a given IP address is automatically allocated from the many global IP addresses possessed by an Internet service provider (the Internet provider, hereinafter simply referred to as "provider") in accessing the Internet and the like. Therefore, in the case where the user validation or authentication is performed based on whether or not the IP address is verified against the IP address registered in the database like the technique disclosed in Japanese Patent Application Laid-Open (JP-A) No. 2001-325229, there is a risk of mistaking the access of a valid user for the illegal access or mistaking the illegal user for a valid user.

As a technique of to prevent spoofing and improve a degree of security, a technique of performing an authentication of a terminal device by using an electronic certificate prior to the user authentication based on the user ID and the password. By applying the technique, even if the user ID and the password are leaked to another person, a fraud can be prevented unless a person who knows the user ID and the password operates the terminal device in which the legitimate electronic certificate is installed. However, in order to apply the technique, it is necessary to perform a troublesome task of installation of the electronic certificate in the terminal device, which results in a problem of a large burden to a user.

In view of the foregoing, an object of the invention is to obtain a user validation apparatus, a user validation method, and a user validation program which can improve accuracy of user validation without reducing user's convenience.

Means for Solving the Problem

In the case where HTTP (Hyper Text Transfer Protocol) is applied as a protocol of an application layer in communication with the terminal device, an HTTP header is added to a packet received from the terminal device, and the user-agent information is included in the HTTP header. In the user-agent information, a format and the like are not defined on the HTTP protocol, and any character string can be set. For example, in the case where the terminal device is a computer such as a PC (Personal Computer) while an application for transmitting the packet from the computer is a browser (browsing software), information indicating a version and the like of an OS (Operating System) running on the computer and information indicating a version and the like of the browser are set as the user-agent information in a default setting of the browser. Depending on a user operating the computer, sometimes the settings of the browser and the like are updated in advance such that the desired character string is transmitted as the user-agent information.

The user-agent information set by the default setting of the browser includes information indicating how many patches are applied to the OS or the browser in addition to the information of the versions of the OS and the browser. Therefore, in the case where the user-agent information is set by the default-setting browser, although the terminal devices which transmit the same user-agent information exist, a degree of difference among the pieces of the user-agent information transmitted from the terminal devices is high. Contents of the user-agent information are updated when a new patch is made in the OS or the browser or when the version upgrade or conversion is performed, however, because the new patch for OS or the browser or the version upgrade or conversion occurs extremely less frequently, it can be deemed that the user-agent information transmitted from the individual terminal device is substantially kept fixed. In the case where the user sets the user-agent information in advance so as to transmit the desired character string, the degree of difference among the pieces of the user-agent information transmitted from the terminal devices becomes higher.

The inventor focuses attention on the above fact to reach the invention by achieving that the user-agent information which is set in the HTTP header of the packet received previously from the terminal device operated by a certain user is stored, and the user-agent information set in the HTTP header of the packet received from the terminal device operated by the user who is estimated to be the same person is verified against the stored user-agent information, and accordingly, a determination whether or not the terminal device which transmits the currently received packet is identical to the terminal device which transmits the packet received previously can be made, and the accuracy of user validation can be improved.

A user validation apparatus of a first embodiment of the invention is configured to include an extraction unit which extracts user-agent information set in an HTTP header of a packet received from a terminal device by applying HTTP as a protocol of an application layer; an information management unit which stores the user-agent information extracted by the extraction unit from the packet received from the terminal device, which is operated by an individual user, in a storage unit so as to correspond to user identification information of the individual user; and a determination unit which determines whether or not a user operating a given terminal device is a valid user by verifying user-agent information extracted by the extraction unit from a packet received from the given terminal device, against user-agent information stored in the storage unit so as to correspond to user identification information of the user operating the given terminal device.

The first embodiment includes the extraction unit which extracts the user-agent information set in the HTTP header of the packet received from the terminal device by applying HTTP as a protocol of an application layer, and the information management unit stores the user-agent information extracted from the packet received from the terminal device, which is operated by the individual user, in the storage unit so as to correspond to the user identification information of the individual user. A user ID inputted by the individual user operating the terminal device and another identification information uniquely defined from the user ID may be applied to the user identification information. The user-agent information may directly be stored in the storage unit, preferably from the viewpoint of security, the user-agent information may be stored in the storage unit after encrypted by using a known encryption method such as a method with a hash function and the like.

The determination unit of claim 1 of the invention determines whether or not the user operating the given terminal device is a valid user by verifying the user-agent information extracted by the extraction unit from the packet received from the given terminal device, against the user-agent information which is stored in the storage unit so as to correspond to the user identification information of the user operating the given terminal device. As described above, because it can be deemed that the user-agent information transmitted from each terminal device is substantially kept fixed, by verifying the user-agent information extracted from the received packet against the user-agent information stored in the storage unit so as to correspond to the user identification information of the user operating the given terminal device, it can be determined whether or not the terminal device from which the packet is currently received is the terminal device which is previously used by the same user, and, based on the determination, it can be determined whether or not the user operating the terminal device from which the packet is currently received is a valid user.

In the case where HTTP is applied as the protocol of the application layer, because the user-agent information is always set in the HTTP header of the packet received from the terminal device, the user (terminal device) confirmation with the user-agent information has greater versatility than that of the technique disclosed in Japanese Patent Application Laid-Open (JP-A) No. 2000-209284 which cannot be applied to the terminal devices except for the terminal device connected to the network through the telephone exchange, and the user confirmation with the user-agent information has the accuracy of confirmation higher than that of the technique of using the IP address which is probably changed in each access. Additionally, the troublesome task such as the installation of the electronic certificate in the terminal device is not required in the user confirmation with the user-agent information. Accordingly, the invention of claim 1 can improve the accuracy of user validation without reducing the user's convenience.

In the first embodiment, when IP (Internet Protocol) is applied as a protocol of an Internet layer in communication with the terminal device, for example as described in claim 2, it is preferably configured such that the extraction unit further extracts an access source IP address from the packet, the information management unit stores the access source IP address and the user-agent information extracted by the extraction unit from a packet received from a terminal device operated by an individual user, in the storage unit so as to correspond to user identification information of the individual user, and the determination unit determines whether or not a user operating a given terminal device is a valid user by determining whether or not an access source IP address and user-agent information extracted from a packet received from the given terminal device correspond to an access source IP address and user-agent information stored in the storage unit so as to correspond to user identification information of the user operating the given terminal device.

As described above, although it can be deemed that the user-agent information transmitted from each terminal device is substantially kept fixed, in a default setting of the application such as a browser, contents of the user-agent information are changed when a new patch is applied to an OS or the browser or when a version upgrade or exchange of the OS or the browser is performed. In the case where the user performs a setting such that a desired character string is transmitted as the user-agent information, the character string transmitted as the user-agent information may be changed by the user. On the other hand, although the IP address allocated to the individual terminal device may be possibly different in each access, the IP addresses (global IP addresses) for allocating the terminals which are possessed by the individual provider are different from one another within a fixed range, and each terminal accesses the web site through the fixed provider, and therefore, although the IP address allocated to the individual terminal in each access is not always kept fixed, the degree of coincidence is high in the case, for example, the upper several bits are always kept fixed.

On the basis of the above, in a second embodiment, an access source IP address in addition to the user agent information is extracted from the packet, the access source IP address and the user-agent information extracted by the extraction unit from the packet received from the terminal device operated by an individual user, is stored in the storage unit so as to correspond to the user identification information of the individual user, and it is determined whether or not the user operating a given terminal device is a valid user by determining whether or not the access source IP address and the user-agent information extracted from the packet received from the given terminal device correspond to the access source IP address and the user-agent information which are stored in the storage unit so as to correspond to the user identification information of the user operating the given terminal device, and accordingly, the accuracy of user validation can further be improved.

In providing service (referred to as information-transmitting service) in which certain information is distributed to the individual user which has been registered in advance according to a request of the individual user, in the case where the user validation apparatus according to the invention is used when confirming whether or not the user who requests the distribution of the information is a valid user (who has been registered in advance), a demand level of the accuracy of user validation for the user validation apparatus is relatively low, on the contrary, in the case where different kinds of service are provided to the individual users such that financial transactions such as balance inquiry, deposits and withdrawals inquiry, direct deposit, and money transfer are performed according to an instruction from the individual user, the extremely high accuracy of user validation may be required for the user validation apparatus according to the invention.

Therefore, in the first and second embodiments, it may be configured such that the storage unit stores a password set in advance for each individual user so as to correspond to the user identification information of the individual user, and the determination unit makes the determination (whether the user operating the given terminal device is a valid user) based on information extracted by the extraction unit, when a combination of the user identification information and the password inputted by the user operating the given terminal device is stored in the storage unit. In the invention of claim 3, in addition to the conventional user validation (authentication) based on the combination of the user identification information and the password, the user validation is performed based on the user-agent information (and the access source IP address), and therefore, the accuracy of user validation can further be improved, and additionally, even if a third party which illegally obtains the user identification information and the password of a valid user illegally accesses the web site while disguising their identity as that of a valid user, the illegal access can be detected and prevented.

Although the IP address allocated to the terminal device is different in each access, the degree of coincidence is high in the IP address in each access. From this standpoint, in the second embodiment, the determination unil is preferably configured such that, for the access source IP address extracted from the received packet, the determination unit determines whether or not the access source IP address extracted from the received packet corresponds to the access source IP address stored in the storage unit by determining whether or not a coincidence ratio in a predetermined bit unit to the access source IP address stored in the storage unit is equal to or higher than a threshold, and, for the user-agent information extracted from the received packet, the determination unit determines whether or not the user-agent information extracted from the received packet corresponds to the user-agent information stored in the storage unit by determining whether or not the user-agent information extracted from the received packet is identical to the user-agent information stored in the storage unit. Therefore, it can accurately be determined whether or not the access source IP address and the user-agent information extracted from the received packet correspond to the access source IP address and the user-agent information stored in the storage unit.

In the first or second embodiments, in the case where the access from the individual user is restricted only to an access from each fixed terminal device, each one piece of the user-agent information (and the access source IP address) may be stored in the storage unit for the individual user, and therefore, in the second embodiment, when the individual user can be permitted to access from each indefinite terminal device, the information management unit is preferably configured such that, as a result of verifying the access source IP address and the user-agent information extracted from the received packet against the access source IP address and the user-agent information stored in the storage unit, when the determination unit determines that the access source IP address and the user-agent information extracted from the received packet do not correspond to the access source IP address and the user-agent information stored in the storage unit, the information management unit additionally stores the access source IP address and the user-agent information extracted from the received packet in the storage unit so as to correspond to the user identification information, and, when the plurality of sets of the access source IP address and the user-agent information are stored in the storage unit so as to correspond to the user identification information of the user operating the given terminal device, the determination unit determines whether or not the user operating the given terminal device is a valid user by respectively verifying the access source IP address and the user-agent information extracted from the packet received from the given terminal against a plurality of sets of the access source IP address and the user-agent information.

In the third embodiment, in the case where the individual user accesses the web site through the new terminal device which is not used previously, the determination unit determines that the access source IP address and the user-agent information extracted from the received packet are the access source IP address and the user-agent information stored in the storage unit, and thereby it is determined that the user is not a valid user, in this case, the information management unit additionally stores the access source IP address and the user-agent information extracted from the received packet in the storage unit so as to correspond to the user identification information. When the plural sets of the access source IP address and the user-agent information corresponding to the user identification information of the user operating the given terminal device are stored in the storage unit, the determination unit respectively verifies the access source IP address and the user-agent information extracted from the packet received from the given terminal device against the plural registered sets of the access source IP address and the user-agent information, and thereby it is determined whether or not the user operating the given terminal device is a valid user, and accordingly, in the subsequent accesses through the new terminal device, it is determined that user operating the given terminal device is a valid user.

Thus, according to the third embodiment, the individual user can access by using a desired terminal device in plural terminal devices such as terminal devices placed in home or in the office. Even if the individual user are permitted to access the web site from each indefinite terminal device, the number of terminal devices used by the individual user is frequently limited, and therefore it is hardly determined in each time that the user is not a valid user since the user hardly accesses the web site through the new terminal device in each time.

In the third embodiment, in the case where it is determined that the access source IP address and the user-agent information extracted from the received packet do not correspond to the access source IP address and the user-agent information stored in the storage unit, the information management unit may additionally stores the access source IP address and the user-agent information in the storage unit only when the user operating the terminal device of the packet source is validated to be a valid user by a method different from the determination unit.

In the third embodiment, the determination unit may be configured such that, when the plurality of sets of the access source IP address and the user-agent information are stored in the storage unit so as to correspond to the user identification information of the user operating the given terminal device, the determination unit determines that the user operating the given terminal device is a valid user when the access source IP address and the user-agent information extracted from the received packet correspond to at least one set of the access source IP address and the user-agent information among the plurality of sets of the access source IP address and the user-agent information stored in the storage unit. Therefore, even if a valid user accesses the web site by selectively using the plural terminal devices, the determination of a valid user can be made with high accuracy.

In the third embodiment, the determination unit may be configured such that, when the plurality of sets of the access source IP address and the user-agent information are stored in the storage unit so as to correspond to the user identification information of the user operating the given terminal device, the determination unit determines that the user operating the given terminal device is not a valid user when no set of the access source IP address and the user-agent information, that is determined to respectively correspond to the access source IP address and the user-agent information extracted from the received packet, exists among the plurality of sets of the access source IP address and the user-agent information stored in the storage unit. Accordingly, even if a third party which is not a valid user accesses the web site, by comparing with the past access, it can be determined that it is not a valid user based on the fact that at least one of the access source IP address or the user-agent information differs from the access source IP address and the user-agent information stored in the storage unit. Therefore, the third party which is not a valid user can accurately be distinguished from a valid user.

Thus, even if the user operating the terminal device of the packet source is a valid user, in the case of the particular usage environment such as the case in which the user accesses the web site in each time by using a different terminal device in the plural terminal devices, and the case in which, although the user accesses the web site by using the fixed terminal device, the terminal device used for the access is a portable terminal device such as a notebook PC, or the user accesses the web site in each time by using a different hot spot (a site where public wireless LAN can be used), an disadvantage in that it is determined that the user operating the terminal device of the packet source is not a valid user, because no set of the access source IP address and the user-agent information which is determined to respectively correspond to the access source IP address and the user-agent information extracted from the received packet exists among the plural sets of the access source IP address and the user-agent information stored in the storage unit.

In consideration of the above, the information management unit is preferably configured such that, when notified that the user who has been determined by the determination unit not to be a valid user, has been determined to be a valid user by a confirmation method different from the user validation of the determination unit, the information management unit stores predetermined identification information in the storage unit so as to correspond to the user identification information of the user, and the determination unit determines that the user operating the given terminal device is a valid user when the predetermined identification information is stored in the storage unit so as to correspond to the user identification information of the user operating the given terminal device and when, among the plurality of sets of the access source IP address and the user-agent information, more than one set of the access source IP address and the user-agent information exists which is determined to correspond to the access source IP address extracted from the received packet, or when more than one set of the access source IP address and the user-agent information exists which is determined to correspond to the user-agent information extracted from the received packet.

Accordingly, when notified that the user who has been determined by the determination unit not to be a valid user, has been determined to be a valid user by the confirmation method different from the user validation of the determination unit, it is deemed that the user has the special usage environment, and the predetermined identification information is stored in the storage unit so as to correspond to the user identification information. For the user of which the predetermined indication information is stored in the storage unit, it is determined that the user operating the given terminal is a valid user when, among the plurality of sets of the access source IP address and the user-agent information, more than one sets of the access source IP address and the user-agent information exists, which is determined to correspond to the access source IP address extracted from the received packet, or when more than one sets of the access source IP address and the user-agent information exists, which is determined to correspond to the user-agent information extracted from the received packet.

Therefore, for example, in the case where a valid user accesses the web site in each time by using the different terminal device in the plural terminal devices, it can be determined that the user is a valid user based on the fact that more than one sets of the access source IP address and the user-agent information exists which is determined to correspond to the access source IP address extracted from the received packet among the plural stored sets of the access source IP address and the user-agent information. In the case where a valid user accesses the web site by using the different hot spot with the portable terminal device each time, it can be determined that the user is a valid user based on the fact that more than one sets of the access source IP address and the user-agent information exists which is determined to correspond to the user-agent information extracted from the received packet among the plural stored sets of the access source IP address and the user-agent information. Accordingly, the user validation can be performed with high accuracy even if the user has the special usage environment.

In the first or second embodiment, the user validation apparatus preferably further includes an electronic mail address storage unit which stores an electronic mail address used by the individual user so as to correspond to the user identification information of the individual user; and a transmission unit which transmits the electronic mail, at which a link to a predetermined web page is added in order to confirm whether or not the user is a valid user by a method different from the determination unit, to the electronic mail address stored in the electronic mail address storage unit so as to correspond to the user identification information of the user, when the determination unit determines that the user operating the given terminal device is not a valid user. Accordingly, an operation by which the user, who has been determined not to be a valid user, receives the validation whether or not the user is a valid user by a method different from the determination unit becomes simple, and the burden to the user who has been determined not to be a valid user can be reduced.

In the third embodiment, the information management unit may be configured such that, as a result of verifying the access source IP address and the user-agent information extracted from the received packet against each of the plurality of sets of the access source IP address and the user-agent information stored in the storage unit, when the determination unit determines that the access source IP address and the user-agent information extracted from the received packet do not correspond to any one of plurality of sets of the access source IP address and the user-agent information stored in the storage unit, and when the number of sets of the access source IP address and the user-agent information stored in the storage unit so as to correspond to the user identification information of the user operating the given terminal device reaches a predetermined upper limit value, the information management unit updates the set of the access source IP address and the user-agent information, of which time which has been stored in the storage unit is the earliest in the plurality of sets of the access source IP address and the user-agent information stored in the storage unit, with the access source IP address and the user-agent information extracted from the received packet, and stores the access source IP address and the user-agent information extracted from the received packet in the storage unit.

Accordingly, the number of sets of the access source IP address and the user-agent information stored in the storage unit for the individual user can be prevented from exceeding the upper limit value, the storage capacity of the storage unit can be saved, and additionally, the number of sets of the access source IP address and the user-agent information which the determination unit verifies against the access source IP address and the user-agent information extracted from the received packet also becomes equal to the upper limit value or less, and thereby the large burden applied to the determination unit can be prevented.

In view of the above, when the determination unit determines that the access source IP address and the user-agent information extracted from the received packet do not correspond to any one of the plurality of sets of the access source IP address and the user-agent information stored in the storage unit, and when the number of sets of the access source IP address and the user-agent information stored in the storage unit so as to correspond to the user identification information of the user operating the given terminal device reaches a predetermined upper limit value, the information management unit overwrites and stores the new access source IP address and the new user-agent information extracted from the received packet in the storage unit, only when it is confirmed that the user operating the terminal device of a packet source is a valid user by a method different from the determination unit.

On the other hand, when the determination unit determines that the access source IP address and the user-agent information extracted from the received packet do not correspond to any one of the plural sets of the access source IP address and the user-agent information stored in the storage unit and, when the number of sets of the access source IP address and the user-agent information stored in the storage unit so as to correspond to user identification information of the user operating the given terminal device reaches the predetermined upper limit value, in the case where the information management unit overwrites and stores the new access source IP address and the new user-agent information with no condition (as described above, not depending on whether or not it is confirmed that the user is a valid user by the method different from the determination unit), the information corresponding to a valid user may be possibly overwritten and deleted when the new access source IP address and the new user-agent information are information corresponding to the illegal access, and in this case, by determining that the access from a valid access is "not a valid user", and thereby effects that the existence of the illegal access can be detected can be obtained.

In the third embodiment, the information management unit is preferably configured such that, as a result of respectively verifying the access source IP address and the user-agent information extracted from the received packet against the plurality of sets of the access source IP address and the user-agent information stored in the storage unit, when the determination unit determines that the access source IP address and the user-agent information extracted from the received packet correspond to a specific set of the access source IP address and the user-agent information among the plurality of sets of the access source IP address and the user-agent information stored in the storage unit, the information management unit overwrites the specific set of the access source IP address and the user-agent information with at least the user-agent information of the set of the access source IP address and the user-agent information extracted from the received packet, and stores the user-agent information in the storage unit.

As described above, in the case where the default setting of the application such as the browser is used, contents of the user-agent information are changed when the new patch is applied to the OS or the browser, or when the version upgrade or exchange of the OS or the browser is performed. In the case where the user performs the setting such that the desired character string is transmitted as the user-agent information, contents of the user-agent information are changed when the user changes the character string transmitted as the user-agent information. However, once the contents of user-agent information are changed, the contents are not changed for a while. Therefore, as described above, the specific set of the access source IP address and the user-agent information which is determined to correspond to the access source IP address and the user-agent information stored in the storage unit is overwritten without at least the user-agent information of the access source IP address and the user-agent information extracted from the received packet, and the user-agent information is stored in the storage unit, and thereby, for at least the user-agent information, the latest information is stored in the storage unit, and the accuracy of subsequent user validation can be improved. In this embodiment, the access source IP address extracted from the received packet may be overwritten and stored along with the user-agent information.

A user validation method of the disclosure may include extracting user-agent information set in an HTTP header of a packet received from a terminal device operated by an individual user by applying HTTP as a protocol of an application layer, and storing the extracted user-agent information in a storage unit so as to correspond to user identification information of the individual user; and extracting user-agent information set in an HTTP header of a packet received from a given terminal device by applying HTTP as the protocol of the application layer, and determining whether or not a user operating the given terminal device is a valid user by verifying the extracted user-agent information against user-agent information stored in the storage unit so as to correspond to user identification information of the user operating the given terminal device. Accordingly, similarly to the invention of claim 1, the accuracy of user validation can be improved without reducing the user's convenience.

A user validation program of the disclosure may cause a computer comprising a storage unit to act as: an extraction unit which extracts user-agent information set in an HTTP header of a packet received from a terminal device by applying HTTP as a protocol of an application layer; an information management unit which stores the user-agent information extracted by the extraction unit from the packet received from the terminal device, which is operated by an individual user, in a storage unit so as to correspond to user identification information of the individual user; and a determination unit which determines whether or not a user operating a given terminal device is a valid user by verifying user-agent information extracted by the extraction unit from a packet received from the given terminal device against user-agent information which is stored in the storage unit so as to correspond to user identification information of the user operating the given terminal device.

A user validation program of the invention causes a computer comprising the storage unit to act as the extraction unit, the information management unit, and the determination unit, and accordingly, the computer executes the user validation program and thereby the computer acts as the user validation apparatus of the first embodiment, and therefore, similarly to the first embodiment, the accuracy of user validation can be improved without reducing the user's convenience.

Effect of the Invention

As described above, in the invention, the user-agent information extracted from the HTTP header of the packet, which is received from the terminal device operated by the individual user by applying HTTP as the protocol of the application layer to the terminal device, is stored in the storage unit so as to correspond to the user identification information of the individual user, and, the user-agent information extracted from the HTTP header of the packet received from the given terminal device is verified against the user-agent information which is stored so as to correspond to the user identification information of the user operating the given terminal device, and thereby it is determined whether or not the user operating the given terminal device is a valid user. Therefore, the invention has the excellent effect of being able to improve the accuracy of user validation without reducing the user's convenience.

BRIEF DESCRIPTION OF THE DRAWINGS

FIG. 2 is a conceptual view explaining addition and removal of a header in each layer when HTTP data is transmitted from a client terminal to a server;

FIG. 3 is a flowchart showing contents of a user authentication process performed by an application server;

FIG. 4 is a schematic view showing contents of usage history information;

FIG. 5 is a view showing a criterion for authentication success/failure based on the usage history information;

BEST MODE FOR CARRYING OUT THE INVENTION

Figure 1:
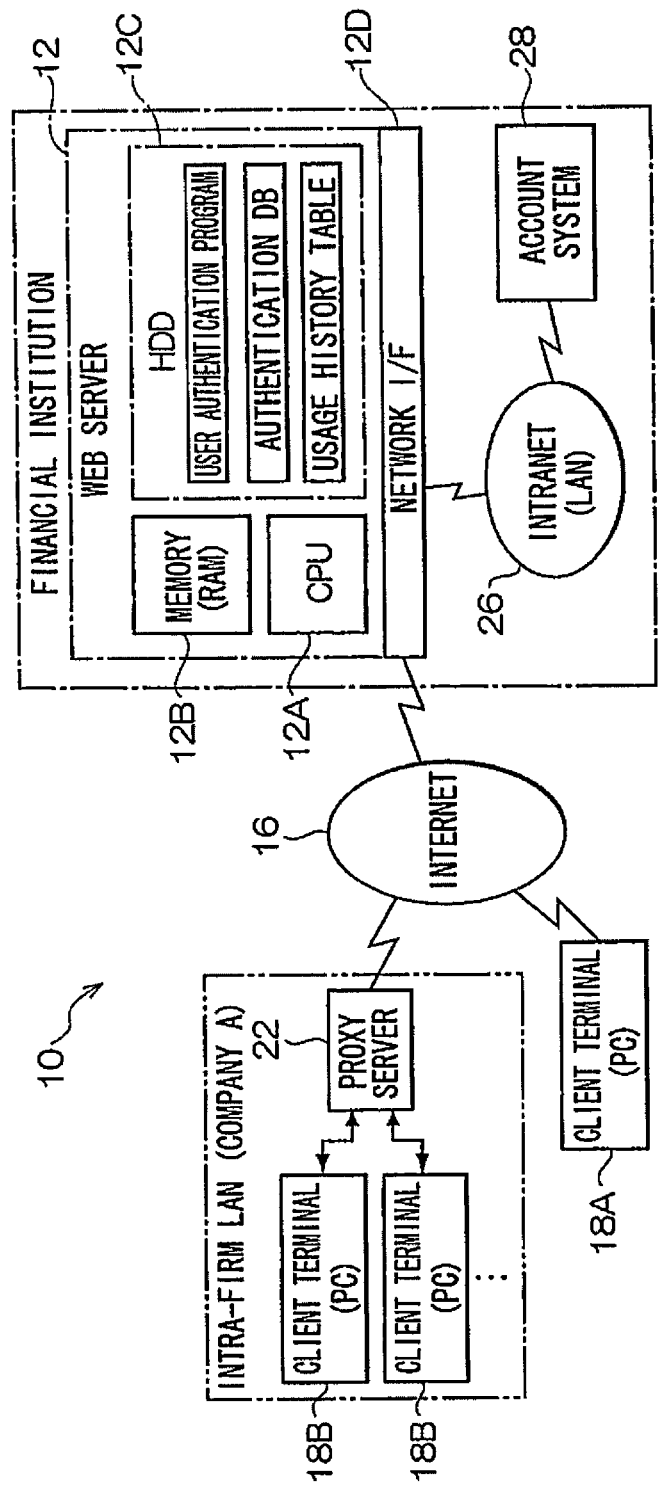
FIG. 1 is a block diagram showing a schematic configuration of a computer system according to an embodiment.

An embodiment of the invention will be described in detail with reference to the drawings. FIG. 1 shows a computer system 10 according to the embodiment. The computer system 10 of the embodiment includes a web server 12 placed in a financial institution. The web server 12 includes CPU 12A, a memory 12B formed by RAM and the like, a hard disk drive (HDD) 12C, and a network interface (I/F) unit 12D. An authentication information database (DB) and a usage history table (described in detail later) are stored in HDD 12C, and HDD 12C corresponds to the storage unit according to the invention. A user authentication program is installed in HDD 12C, and CPU 12A performs a later-mentioned user authentication process using the user authentication program. The user authentication program corresponds to a user validation program, and CPU 12A executes the user authentication program, and thereby the web server 12 acts as the user validation apparatus according to the disclosure.

The network I/F unit 12D of the web server 12 is directly connected to a computer network (the Internet) 16 in which many web servers are connected to one another through a communication line, and the network I/F unit 12D is also connected to an intranet (LAN) 26 which is placed in a financial institution. An account system 28 is connected to the intranet 26. Many client terminals 18 formed by PCs and the like are connected to the Internet 16. The browser is installed in each client terminal 18, and the client terminal 18 corresponds to the terminal device according to the invention. In the mode in which the client terminal 18 is connected to the Internet 16, there is a case in that the client terminal 18 may be directly connected to the Internet 16 like the client terminal designated by the numeral 18A of FIG. 1 (particularly the client terminal 18 is connected to the Internet 16 through a provider (not shown)), and there is another case in that the client terminal 18 may be connected to the Internet 16 through a proxy server 22 placed in a firm like the client terminal designated by the numeral 18B.

Next, operation of the embodiment will be described. The financial institution according to the embodiment provides online financial transaction acceptance service as service with which the user having a bank account of the financial institution can perform an online financial transaction, wherein an instruction for executing the online financial transaction is accepted from the user who uses an online financial transaction web site operated by the web server 12. In the financial transaction utilizing the online financial transaction acceptance service, the user browses a web page of the online financial transaction web site through the client terminal 18, and the user inputs necessary information of the web page to transmit information (financial transaction instruction information) for providing an instruction for executing the financial transaction desired by the user to the web server 12 through the client terminal 18. The financial transaction instruction information is transferred from the web server 12 to the account system 28 connected to the intranet 26, and thereby the financial transaction instructed by the user is performed by the account system 28 based on the financial transaction instruction information.

The user who uses the online financial transaction acceptance service applies for the usage of the service to the financial institution in advance. The financial institution imparts a user ID (corresponds to the user identification information according to the invention) to the user each time the user applies for the usage of the service, and the financial institution registers the imparted user ID along with a password (corresponds to the authentication information according to the invention) and an electronic mail address noticed from the user (electronic mail address used by the user) in the authentication information DB stored in HDD 12C of the web server 12.

Then, the packet which is transmitted from the client terminal 18 to the web server 12 when the user provides the instruction for accessing the online financial transaction web site through the client terminal 18 will be described. In the communication between the client terminal 18 and the web server 12 through the Internet 16, IP is applied as the protocol of an Internet layer, TCP (Transmission Control Protocol) is applied as the protocol of a transport layer, and HTTP is applied as the protocol of an application layer. The instruction for accessing the online financial transaction web site is provided in such a manner that the user operates an input device of the client terminal 18 to specify URL (Uniform Resource Locator) of the online financial transaction web site in the condition that the browser has been launched on the client terminal 18.

When the instruction for accessing the online financial transaction web site is provided, the browser which is an application program for performing a process corresponding to the application layer generates HTTP data, at which information necessary to make a request for distributing the web page corresponding to the specified URL is set, and adds the HTTP header, at which Information corresponding to the application layer is set, to a leading end of the HTTP data (see FIG. 2). In the case where a later-mentioned authentication request packet is transmitted from the client terminal 18 to the web server 12, information including the user ID and the password which the user inputted through the client terminal 18 are set in the HTTP data. The user-agent information is included in the information set in the HTTP header, and the information indicating the version of the OS or the browser running on the client terminal 18 and the information indicating how many patches are applied are set as the user-agent information in the default-setting browser. The browser setting can be changed such that a given character string is fixedly set as the user-agent information, and the character strings which has been specified in advance is set as the user-agent information when the setting is changed.

Processing modules which perform processes corresponding to the transport layer, the Internet layer, and the network interface layer respectively are operating on the client terminal 18. As shown in FIG. 2, the information generated by the browser (HTTP data to which the HTTP header is added) is sequentially transferred from an upper-layer processing module to a lower-layer processing module, and the processing module of each layer performs a process corresponding to each layer and a process of adding a header, in which information corresponding to each layer is set, to the leading end of the transferred information. Therefore, the client terminal 18 transmits the HTTP data in the form of the packet to web server 12 to which a network header corresponding to the network interface layer, an IP header corresponding to the Internet layer, a TCP header corresponding to the transport layer, and the HTTP header corresponding to the application layer are added respectively.

Information such as a destination IP address indicating a destination of the packet and a source IP address (IP address imparted to the client terminal 18) are set as information corresponding to the Internet layer in the IP header by the processing module corresponding to the Internet layer. Information such as a TCP port number is set as information corresponding to the transport layer in the TCP header by the processing module corresponding to the transport layer.

The processing modules of the layers are operating on the web server 12, and the packet from the client terminal 18 is sequentially transferred from the lower-layer processing module to the upper-layer processing module. The processing module of each layer refers to the header corresponding to each layer which is added to the leading end of the transferred packet, and performs the process corresponding to each layer based on the information set in the header, and then the processing module performs a process of removing the header. Therefore, the HTTP data in which only the HTTP header is added to the leading end thereof is transferred to the processing module (also including a processing module performing a later-mentioned user authentication process) of the application layer operating on the web server 12.

In the later-mentioned user authentication process, the web server 12 performs a process using the source IP address (access source IP address) set in the IP header of the packet received from the client terminal 18. However, the source IP address cannot be detected because the IP header has been already removed at the time the processing module performing the user authentication process receives the packet. Therefore, the processing module of the Internet layer operating on the web server 12 performs a process of adding the source IP address, set in the IP header of the packet received from the client terminal 18, to the HTTP data, and thereby the source IP address is transmitted to the processing module (which performs the user authentication process) of the application layer.

In the web server 12, when a certain packet is received from the client terminal 18 through the Internet 16, a predetermined processing module (which is also the processing module corresponding to the application layer) running on the web server 12 determines whether or not the packet received from the client terminal 18 is an authentication request packet based on whether or not predetermined information is set in the HTTP data.

The online financial transaction web site is an aggregate of the many web pages correlated with one another by a link, and a financial transaction execution instruction page is displayed by tracking back the link from the home page of the web site, in which the user can specify a condition of the financial transaction which the user desires and provide an instruction to perform the financial transaction. Input fields for inputting the user ID and the password are provided, and a message for encouraging the user to perform a login operation (input of the user ID and the password) is also displayed in the home page of the online financial transaction web site. When the user inputs the user ID and the password in the corresponding input fields of the home page and transmits the user ID and the password, the authentication request packet in which predetermined information is set in the HTTP data is transmitted from the client terminal 18 which the user operates.

When a predetermined processing module determines that the packet received from the client terminal 18 is not the authentication request packet, the predetermined processing module performs a process corresponding to the received packet, e.g., a process in which the HTTP data for distributing the home page data of the online financial transaction web site to the source client terminal 18 is generated to add the HTTP header to the generated HTTP data. The HTTP data and HTTP header are transmitted as the packet to the client terminal 18 through a process opposite the process shown in FIG. 2. Therefore, the web page which the user has requested through the client terminal 18 is displayed on a display of the client terminal 18.

On the other hand, when the predetermined processing module determines that the packet received from the client terminal 18 is the authentication request packet, the predetermined processing module starts a processing module which performs the user authentication process. Therefore, the user authentication program is executed by CPU 12A, and the user authentication process shown in FIG. 3 is performed.

In the user authentication process, the user ID and the password are extracted from the HTTP data of the received authentication request packet in Step 30, and an authentication process of searching whether or not the combination of the user ID and the password extracted in Step 30 is registered in the authentication information DB is performed in Step 32. In Step 34, it is determined whether or not the authentication is successful in the authentication process of Step 32 based on whether or not the combination of the user ID and the password is extracted from the authentication information DB by the search of Step 32. When the determination is negative, the flow goes to Step 74, the predetermined processing module of the start-up source is notified of the authentication failure, and the user authentication process is ended. In this case, the predetermined processing module performs an error process of displaying a message for notifying that the inputted user ID or password is wrong on the display of the client terminal 18 of the authentication request packet source.

On the other hand, when the authentication is successful in the authentication process of Step 32 (which corresponds to "the combination of the user identification information and the password is stored in the storage unit" of claim 3), the determination of Step 34 is affirmative, and the flow goes to Step 36, and the access source IP address (source IP address) is extracted from the HTTP data of the received authentication request packet, and the user-agent information is extracted from the HTTP header of the authentication request packet. Step 36 corresponds to the extraction unit according to the invention (in particular, the extraction unit of claim 2). In the next Step 38, the user-agent information corresponding to the user ID extracted in Step 30 is extracted from the usage history table stored in HDD 12C, and the extracted usage history information is stored in the memory 12B.

Areas for storing usage history information shown in FIG. 4 for each user (valid user), who applies for the usage of the online financial transaction acceptance service and the user ID is given in advance, is provided in the usage history table according to the embodiment. Areas for storing and registering a customer ID, a transaction suspension flag, a special environment flag, a verification determination threshold, and each piece of information of an index, and further areas where two sets of the access source IP address and the user-agent information can be registered are provided in a usage history information storage area corresponding to each user.

The customer ID which is generated from an account number registered in a customer master by using a hash function is registered in the customer ID area in advance. The transaction suspension flag is a flag which indicates whether or not the authentication in a normal route (based on the access source IP address and the user-agent information) is stopped, and 0 (zero) (meaning that the authentication is valid in the normal route) which is an initial value of the transaction suspension flag is initially set in the transaction suspension flag area. The special environment flag is a flag which indicates whether or not an environment for the usage of the user is special, and 0 (zero) (meaning the normal environment) which is an initial value of the special environment flag is initially set in the special environment flag area. The index id is information which indicates which of the two sets of the access source IP address and the user-agent information (IP0 and UA0, and IP1 and UA1) registered as the usage history information are the latest, and An initial value 0 (zero) (meaning that IP0 and UA0 are the latest) is set in the index area. Blanks (no information) are set as the initial value in the access source IP address area and the user-agent information area, respectively.

In the above Step 38, the customer master (not shown) is searched by using the user ID extracted in the previous Step 30 as a key, and thereby the account number of the bank account possessed by the user to whom the user ID is imparted is extracted, and then, the customer ID is obtained from the extracted account number by using the hash function, the usage history table is searched by using the obtained customer ID as a key, and thereby the usage history information corresponding to the user ID is extracted. In the next Step 40, it is determined whether or not the transaction suspension flag in the extracted usage history information is 1 (one). When the determination is negative, the flow goes to Step 42, and it is determined whether or not at least one set of the access source IP address and the user-agent information is registered in the extracted usage history information.

As described above, in the usage history information area, blanks are set as the initial value in the access source IP address area and the user-agent information area. When the user who applies for the usage of the online financial transaction acceptance service accesses to the online financial transaction web site more than one time, the access source IP address and the user-agent information extracted from the authentication request packet in Step 36 is registered as the usage history information (details are described later). When the access source IP address and the user-agent information has been already registered as the usage history information, the determination of Step 42 is affirmative, and the flow goes to Step 44, and the access source IP address and the user-agent information extracted from the authentication request packet in Step 36 are verified against the access source IP address and the user-agent information registered as the usage history information.

The verification of the IP address is performed as follows. The IP address is a four-byte data. In the embodiment, when the access source IP address is registered in the access source IP address area, a hash value is computed for each byte by using the hash function, and the four hash values are registered as the access source IP address. Therefore, the hash value is also computed for each byte for the access source IP address extracted in Step 36, the obtained four hash values are compared to the four hash values registered in the access source IP address area, and a coincidence ratio is obtained in hash value unit. The obtained coincidence ratio is compared with a verification determination threshold set as the usage history information, and when the coincidence ratio is equal to or higher than the threshold, it is determined that the current access source IP address "corresponds to" the registered IP address, and when the coincidence ratio is lower than the threshold, it is determined that the current access source IP address "does not correspond to" the registered IP address.

In the mode in which the client terminal 18A is directly connected to the Internet 16 as shown in FIG. 1, there is a case in that the IP address (global IP address) of the client terminal 18A may be fixed in advance by a contract with the provider, and there is another case in that an indefinite IP address may be allocated by the provider each time of connection to the Internet 16 (one of the IP addresses within a fixed range which the provider has been secured for the allocation in advance).

In the connection mode in which the client terminal 18B is connected to the Internet 16 through the proxy server 22 placed in the firm as shown in FIG. 1, for example, in the case where the firm obtains the dedicated domain to secure the IP addresses within a fixed range for the allocation in advance, the packet transmitted from the client terminal 18B is transmitted to the Internet 16 after the proxy server 22 overwrites the source IP address set in the IP header with one of the IP addresses within the fixed range which the firm has secured for the allocation in advance.

Accordingly, even with a client terminal 18 of which the allocated IP address is indefinite, because the allocated IP address falls within the fixed range (the allocated IP address has the same upper bytes), when the online financial transaction web site is accessed from the same access source (address of the client terminal 18 on the Internet 16) as the case where the online financial transaction web site is accessed previously, it can be determined that the current IP address corresponds to the registered IP address by determining whether or not the current IP address corresponds to the registered IP address based on whether or not the coincidence ratio of the IP address is equal to or higher than the threshold.

Regarding the user-agent information, when the current user-agent information is identical to the registered user-agent information, it is determined that the current user-agent information "corresponds to" the registered user-agent information, and when the current user-agent information is not identical to the registered user-agent information, it is determined that the current user-agent information "does not correspond to" the registered user-agent information. In the case where the two sets of the access source IP address and the user-agent information are registered as the usage history information, the access source IP address and the user-agent information extracted from the authentication request packet are verified against the registered two sets of the access source IP address and the user-agent information respectively.

In the next Step 46, it is determined which of "success", "conditional success", or "failure" corresponds to the authentication of the user operating the client terminal 18 of the authentication request packet source based on the verification result of the access source IP address and the user-agent information in Step 44, and the flow is branched in accordance with the determination result. The determination is made according to a determination table shown in FIG. 5. In FIG. 5, "OK" corresponds to the case in which it is determined in the verification of Step 44 that the current access source IP address or the current user-agent information correspond to the registered access source IP address or the registered user-agent information respectively, and "x" corresponds to the case in which it is determined that the current access source IP address or the current user-agent information does not correspond to the registered access source IP address or the registered user-agent information respectively. In FIG. 5, the "latest" access source IP address and the "latest" user-agent information express the access source IP address and the user-agent information which are indicated by the index id of the usage history information in the two sets of the access source IP address and the user-agent information registered as the usage history information, and the "previous" access source IP address and the "previous" user-agent information express the other access source IP address and the other user-agent information. In the case where only one set of the access source IP address and the user-agent information ("latest" information) is registered as the usage history information, assuming that both the verification result of the "previous" access source IP address and the "previous" user-agent information do not correspond to the registered access source IP address and the registered user-agent information, the determination of Step 46 is made. The above Steps 44 and 46 as well as the later-mentioned Step 64 correspond to the determination unit according to the second embodiment.

In the case where the verification result of the previous Step 44 satisfies a condition (for convenience, referred to as a first condition) that "the access source IP address and the user-agent information extracted from the authentication request packet respectively correspond to at least one set of the access source IP address and the user-agent information in the two sets of the access source IP address and the user-agent information registered as the usage history information," because it can be deemed that the current access has the same access source and the client terminal 18 as the case where the same user accesses the online financial transaction web site previously, there is the extremely high possibility that the user operating the client terminal 18 of the authentication request packet source is a valid user. Therefore, in Step 46, in the above case, it is determined that the authentication is "success" as shown by "authentication success" in FIG. 5.

On the other hand, when the verification result of the previous Step 44 satisfies a condition (for convenience, referred to as a second condition) that "no set of the access source IP address and the user-agent information which corresponds to the access source IP address and the user-agent information extracted from the authentication request packet exists in the sets of the access source IP address and the user-agent information registered as the usage history information," because at least one of the access source or the client terminal 18 in the current access differs from the case where the same user accesses the online financial transaction web site previously, there is high possibility that the user operating the client terminal 18 of the authentication request packet source is not a valid user.

However, there is possibility that the user among the many users may have a special usage environment, for example, the user possesses the many client terminals 18 which can be used to access the online financial transaction web site, and the user accesses the online financial transaction web site through an indefinite client terminal 18 among the many client terminals 18 (in this case, there is high probability that the pieces of user-agent information differ from one another in each access), or the user uses different hot spots in each time to access the online financial transaction web site by using a portable client terminal 18 such as a notebook PC (in this case, there is high probability that the access source IP addresses differ largely from one another in each access), and such users who have the special usage environment also correspond to the second condition.

Therefore, in the case where the verification result in Step 44 satisfies a condition (for convenience, referred to as a third condition) that "it is determined that both the two sets of the access source IP address and the user-agent information registered as the usage history information correspond to the access source IP address extracted from the authentication request packet or the user-agent information extracted from the authentication request packet," it is determined in Step 46 that the authentication is "conditional success" as shown by "authentication conditional success" in FIG. 5. In the case where the verification result in Step 44 satisfies the second condition while not satisfying the third condition, it is determined that the authentication is "failure" as shown by "authentication failure" in FIG. 5.

When it is determined that the authentication is "success" in Step 46, the flow goes to Step 48 to determine whether or not the special environment flag of the usage history information is 1 (one). When the determination is negative, the flow goes to Step 52, the predetermined processing module of the start-up source is notified of the authentication success. In this case, the predetermined module performs the process of distributing the predetermined web page, which is distributed only to the user who is confirmed to be a valid user, to the client terminal 18 of the authentication request packet source is performed. In the next Step 54, it is determined whether or not the access source IP address and the user-agent information extracted from the authentication request packet correspond to the "latest" access source IP address and the "latest" user-agent information indicated by the index id in the access source IP address and the user-agent information registered as the usage history information.

When the determination is affirmative, the flow goes to Step 60, the "latest" access source IP address and the "latest" user-agent information registered as the usage history information are overwritten with the access source IP address and the user-agent information extracted from the authentication request packet, and the access source IP address and the user-agent information extracted from the authentication request packet are registered, and then, the flow goes to Step S62. When the determination of Step 54 is negative, the flow goes to Step 56, the "previous" access source IP address and the "previous" user-agent information (the access source IP address and the "previous" user-agent information which are not indicated by the index id) registered as the usage history information are overwritten with the access source IP address and the user-agent information extracted from the authentication request packet, and the access source IP address and the user-agent information extracted from the authentication request packet are registered (in the case where the access source IP address and the user-agent information to be overwritten are the "blanks", the update registration of Step 56 corresponds to the "additional storage" of the third embodiment). In the next Step 58, the access source IP address and the user-agent information which has been overwritten and registered in Step 56 are changed to the "latest" access source IP address and the "latest" user-agent information by inverting the bit of the index id.

In Step 62, the usage history information stored in the memory 12B is re-written in the usage history table, and thereby the usage history information of the usage history table is updated and the user authentication process ends. Like the above Steps 60 and 56, the access source IP address and the user-agent information registered as the usage history information are overwritten with the access source IP address and the user-agent information extracted from the authentication request packet, and the access source IP address and the user-agent information extracted from the authentication request packet are registered. Therefore, the accuracy of verification of Step 44 and the accuracy of determination of Step 46 can be improved when the user authentication process is performed again for the same user. Steps 54 to 62 correspond to the information management unit according to the invention (the information management unit of claims 2, 5, and 11, in particular).

Figure 6:
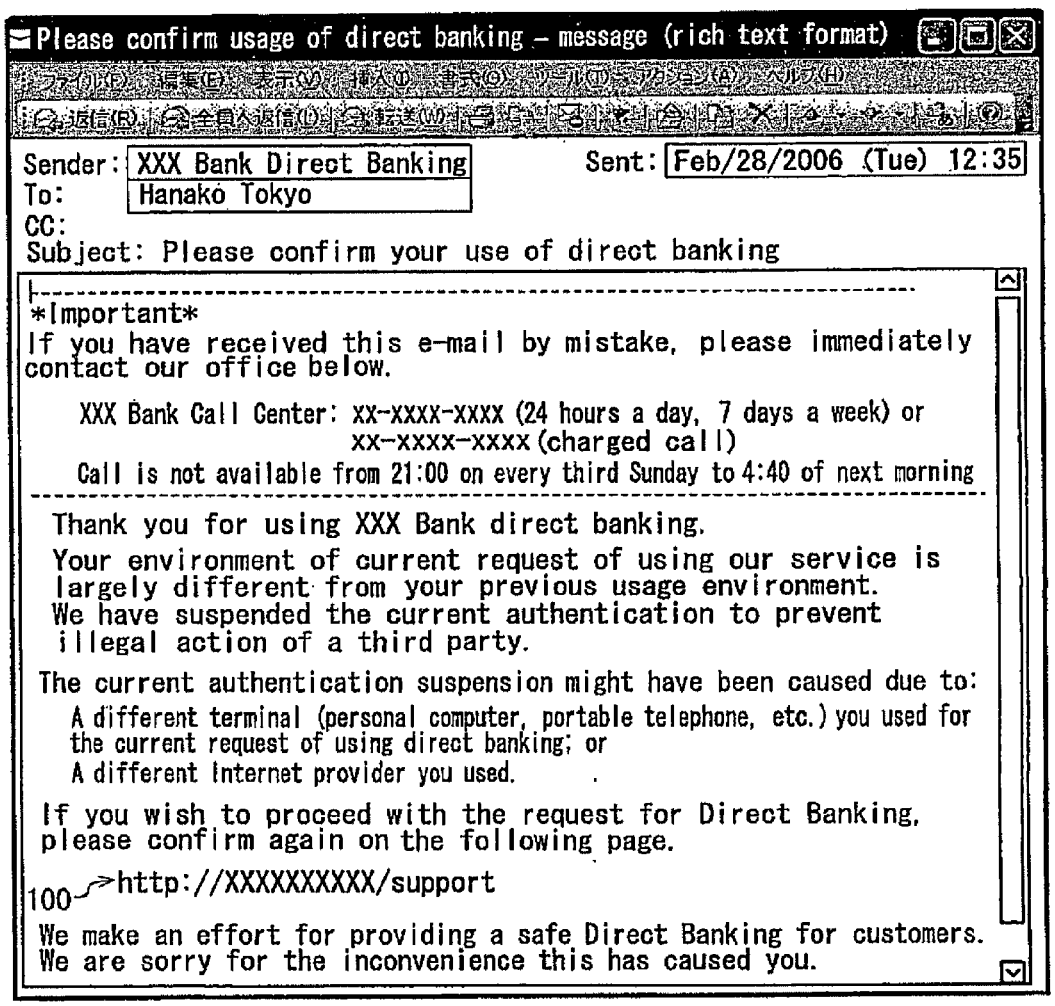
FIG. 6 is a screen image showing an example of a re-authentication request e-mail.

On the other hand, when it is determined that the authentication of the previous Step 46 is "failure", the flow goes to Step 68, and the transaction suspension flag in the usage history information is set to 1 (one). Even in the case where it is determined that the authentication in Step 46 is "failure", there is the possibility that the user operating the client terminal 18 of the authentication request packet source may be a valid user. With this point in view, in the next Step 70, an electronic mail address which is stored in the authentication information DB so as to correspond to the user ID extracted in Step 32 is read, and a re-authentication request e-mail is transmitted to the read electronic mail address. In an example shown in FIG. 6, a link 100 to the web page dedicated to the re-authentication is added to the re-authentication request e-mail which confirms whether or not the user operating the client terminal 18 of the authentication request packet source is a valid user by an authentication method different from the normal route. Step 70 corresponds to the transmission unit of claim 9.

In Step 72, the predetermined processing module of the start-up source is notified of the authentication failure, and the flow goes to Step 54. Accordingly, as described above, the update and registration of the access source IP address and the user-agent information extracted from the authentication request packet are performed in the usage history information, and the usage history information is re-written in the usage history table. Then, the user authentication process is ended.

As described above, the transaction suspension flag is set to 1 (one) when it is determined that the authentication of Step 46 is "failure", and therefore, in the case where the user authentication process is performed again to the same user, the determination of Step 40 is affirmative and the flow goes to Step 70, and thereby the authentication is not performed in the normal route (the authentication based on the access source IP address and the user-agent information), but the re-authentication request e-mail is transmitted again (Step 68) to notify the predetermined processing module of the start-up source of the authentication failure again (Step 72). Accordingly, in the case where the previous user authentication process in which it is determined in Step 46 that the authentication is "failure" is performed by an illegal access of a third party which illegally obtains the user ID and the password, the existence of the illegal access can be detected instead although the authentication is "failure" when a valid user accesses the online financial transaction web site to receive the authentication.

In the case where it is determined in Step 46 that the authentication is "failure" even if the user operating the client terminal 18 of the authentication request packet source is a valid user, the user receives the re-authentication request e-mail transmitted in the previous Step 70, the user accesses the web page dedicated to the re-authentication from the link 100 added to the received re-authentication request e-mail, and the user receives a predetermined re-authentication procedure through the web page dedicated to the re-authentication displayed on the display of the client terminal 18. In the case where the user is confirmed to be a valid user by the re-authentication procedure, the processing module which performs the user authentication process is notified of the re-authentication success. In order to access the web page dedicated to the re-authentication, it is necessary to have the environment in which the re-authentication request e-mail can be received, and it can be deemed there is extremely high possibility that a person who accesses the web page dedicated to the re-authentication to receive the re-authentication procedure is a valid user at that time, and accordingly the burden to the user can be reduced by a relatively simple re-authentication procedure.

Figure 7:
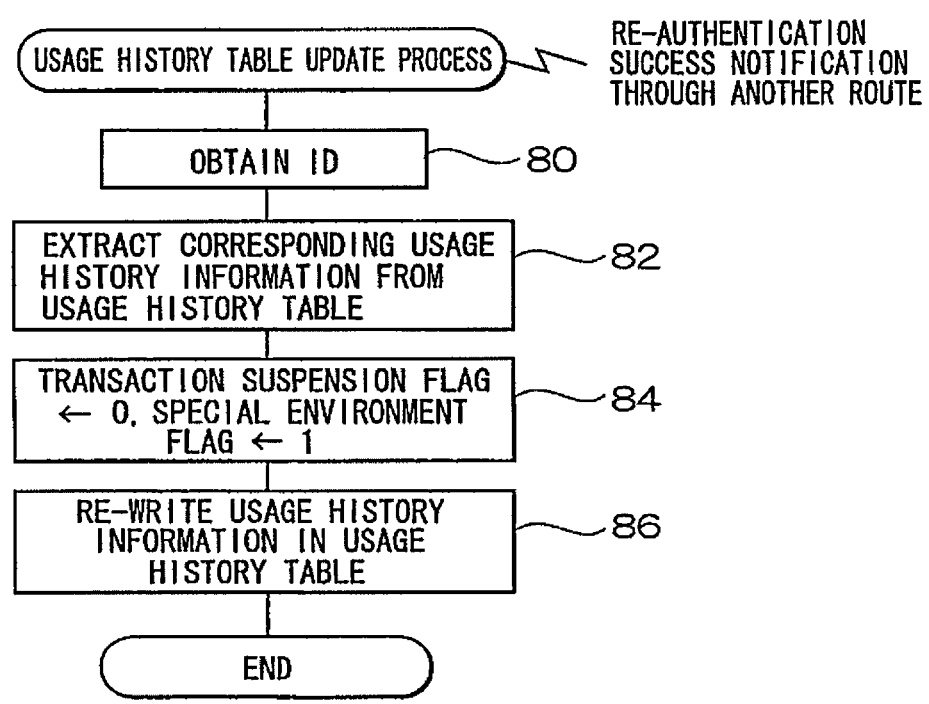
FIG. 7 is a flowchart showing contents of a usage history table update process.

On the other hand, when the processing module which performs the user authentication process is notified of the re-authentication success, the processing module performs a usage history table update process shown in FIG. 7. That is, the user ID of the user who is confirmed to be a valid user by the re-authentication procedure is added as information to the above re-authentication notification, and first, in Step 80, the user ID of the user who is confirmed to be a valid user is extracted and obtained. In the next Step 82, the usage history information corresponding to the user ID obtained in Step 80 is extracted from the usage history table, and the extracted usage history information is stored in the memory 12B. In Step 84, in the extracted usage history information, the transaction suspension flag is returned to 0 (zero), and the special environment flag is set to 1 (one). In Step 86, the usage history information is re-written in the usage history table, and the usage history table update process is ended. By returning the transaction suspension flag to 0 (zero) as described above, in the case where the user authentication process is performed to the same user again, the determination of Step 40 is negative to resume the authentication in the normal route. Step 84 corresponds to the information management unit of claim 8.

When it is determined that the authentication of Step 46 is "conditional success", the flow goes to Step 64, and it is determined whether or not the special environment flag in the usage history information is set to one. When the authentication is "conditional success", as described above, there is the high probability that the user operating the client terminal 18 of the authentication request packet source has the special usage environment, however, it is also undeniable that the illegal access is performed by the third party. Therefore, in the "conditional success" in the embodiment, the authentication success in the re-authentication procedure is a condition of the authentication success. When the determination of Step 64 is negative, namely, when the processing module is not notified of the re-authentication success, the flow goes to Step 68 to perform the process of transmitting the re-authentication request e-mail as described above.

Figure 8:
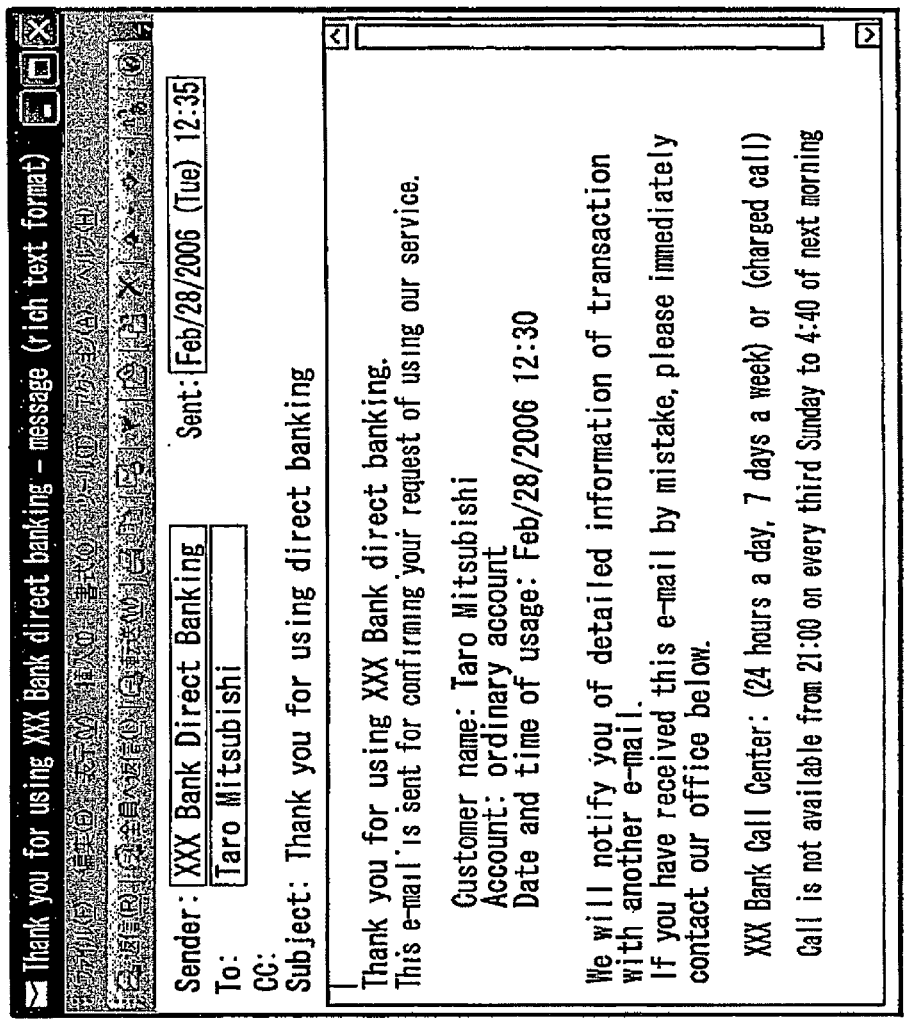
FIG. 8 is a screen image showing an example of a confirmation e-mail.

When the determination of Step 64 is affirmative, namely, when the processing module is notified of the re-authentication success to perform the usage history table update process (FIG. 7), the flow goes to Step 66, and the electronic mail address which is stored in the authentication information DB so as to correspond to the user ID extracted in Step 32 is read, and a confirmation e-mail of which example is shown in FIG. 8 is transmitted to the read electronic mail address. A data and time and the like are described in the confirmation e-mail, and in the event that the current access is the illegal access, a valid user receives and refers to the confirmation e-mail, which allows the existence of the illegal access to be detected. After the process of Step 66 is performed, the flow goes to Step 52 to notify the predetermined processing module of the start-up source of the authentication success, and then, in the processes from Step 54, the access source IP address and the user-agent information extracted from the authentication request packet are overwritten and registered in the usage history information, and the usage history information is re-written in the usage history table, and then, the user authentication process is ended. Accordingly, it can be determined whether or not the user is a valid user even for the user having the special usage environment.

When the special environment flag is set to 1 (one), when the determination of Step 46 satisfies the third condition as described above, it is determined that the authentication is "success", and therefore there is a drawback of reducing the degree of security slightly. Therefore, in the case where the first condition is satisfied in the determination of Step 46 to determine that the authentication is "success", it is determined in Step 48 whether or not the special environment flag is set to 1 (one), and when the determination is affirmative, the special environment flag is returned to 0 (zero) in Step 50, and then the flow goes to Step 52. Accordingly, the drawback can be dissolved.

Finally, the case in which the user who applies for the usage of the online financial transaction acceptance service first accesses the online financial transaction web site at first time will be described. In this case, the access source IP address and the user-agent information are not registered in the usage history information, and the authentication is hardly performed in the normal route. Therefore, the determination of Step 42 is negative, and the flow goes to Step 68, and the transaction suspension flag is set to 1 (one) as described above, and the process of transmitting the re-authentication request e-mail is performed to receive the predetermined re-authentication procedure through the web page dedicated to the re-authentication. In this case, in Step 60, the access source IP address and the user-agent information are also registered in the usage history information, and the transaction suspension flag is returned to 0 (zero) when the re-authentication is successful. Therefore, the authentication in the normal route is performed in the subsequent accesses.

The maximum two sets of the access source IP address and the user-agent information are registered for each user are registered as above, however, it is not limited to this, more than two sets of the access source IP address and the user-agent information may be registered for each user. In such cases, unless a set of the access source IP address and the user-agent information which is determined to correspond to a new access source IP address and a new user-agent information extracted from the authentication request packet exists in the already registered sets of the access source IP address and the user-agent information, the new set of the access source IP address and the user-agent information is additionally registered until the number of registered sets of the access source IP address and the user-agent information reaches the upper limit value, and the earliest set of the access source IP address and the user-agent information may be overwritten with the new set of the access source IP address and the user-agent information and the new set of the access source IP address and the user-agent information is registered after the number of registered sets of the access source IP address and the user-agent information reaches the upper limit value.

Alternatively, it is not necessary that the upper limit value is provided for the number of registered sets of the access source IP address and the user-agent information. For example, in consideration of the special usage environment in which the access is made by selectively using the many client terminals 18 or many kinds of the access sources (for example, many hot spots), the sets of the access source IP address and the user-agent information are registered without the upper limit (When the set of the access source IP address and the user-agent information, which is determined to correspond to the new access source IP address and the new user-agent information extracted from the authentication request packet exists in the already registered sets of the access source IP address and the user-agent information, the set of the access source IP address and the user-agent information is overwritten with the new set of the access source IP address and the user-agent information and the new set of the access source IP address and the user-agent information is registered, otherwise, the new access source IP address and the new user-agent information are additionally registered), and the set of the access source IP address and the user-agent information which exceeds a threshold of an elapsed time since the registration, or which exceeds a threshold of times when it is determined that the set of the access source IP address and the user-agent information does not corresponds to the new access source IP address and the new user-agent information may be deleted. In this aspect, although there is a drawback of possibly enlarging the usage history information, it can be determined in Step 46 that the authentication is "success" even in the user having the special usage environment, and accordingly, it is not necessary to provide "conditional success" of the authentication, and the security can further be improved.

The client terminal 18 formed by the PC or the like is described as the terminal device according to the invention by way of example, however, it is not limited to this, the client terminal 18 may be a portable terminal such as PDA and a portable telephone which has a function of accessing the Internet. This kind of portable terminal is connected to the Internet through a gateway server provided in a wireless communication network, in particular, the gateway server temporarily receives information which is transmitted from the portable terminal to access a given web site, and the information is converted into the packet pursuant to the protocol (IP: protocol of the Internet layer, TCP: protocol of the transport layer, and HTTP: protocol of the application layer) applied to the communication through the Internet 16, and one of the IP addresses within a fixed range which a wireless carrier has secured in advance is set as the source IP address to the IP header, and information including a name of the wireless carrier, a type and a model number of the portable terminal, and a version of a browser are set as the user-agent information to the HTTP header, and then, the user-agent information is transmitted to the Internet 16. Depending on a contract mode with the wireless carrier, the gateway server and a specific web server are connected with a dedicated line, and there is a case in that the packet to the specific web server may be transmitted from the gateway server not through the Internet 16. Even in such communication modes, the source IP address and the user-agent information are set in the packet similarly as above. The range of the IP address secured for the allocation depends on each wireless carrier. Accordingly, even if the terminal device is the portable terminal, it can be confirmed whether or not the user operating the portable terminal is a valid user by applying the invention.

Further, in the embodiment, the invention is applied to the user authentication in the online financial transaction web site which provides the online financial transaction acceptance service, however, it is not limited to this, the invention may be applied to a user authentication or a user validation in any site. In the above embodiment, the user authentication to which the invention applied is used in conjunction with the user authentication in which the user ID and the password are used, however, since the high-accuracy user validation (authentication) is not required as long as the web site provides information-transmitting service in which certain information is distributed at each time the user who registers in advance requests a simple user identification information such as an electronic mail address. Therefore, the user authentication based on the password may be omitted, and only the user validation (authentication) to which the invention is applied may be performed based on the user identification information such as the electronic mail address inputted by the user.

Although the user validation (authentication) is performed by using the access source IP address and the user-agent information in the above embodiment, however, it is not limited to this, for example, in the case where only the access from a fixed terminal device is permitted for each user like a web site where only an access from a client terminal in which an electronic certificate is installed is permitted for each user, only the user-agent information may be stored so as to correspond to the user identification information, and the user validation (authentication) may be performed based on whether or not the user-agent information is verified against the registered user-agent information.

EXPLANATION OF REFERENCE NUMERALS

10 computer system
12 web server
12C HDD
16 Internet
18 client terminal

The invention claimed is:

1. A user validation apparatus comprising:
a memory configured to store instructions; and
a controller that is configured to execute the instructions to:
extract user-agent information about an individual user and a user access source IP address in a hyper-text transfer (HTTP) header of a packet received from a terminal device, which is operated by the individual user, by applying HTTP as a protocol of an application layer;
verify: (i) whether or not the extracted user-agent information corresponds to each user-agent information in two sets of user-agent information stored in a storage unit, and (ii) whether or not the extracted IP address corresponds to each IP address in two access source IP addresses stored in the storage unit;
determine the user is a valid user, based at least in part on the verification result when: (a) the extracted user-agent information corresponds to each of the two sets of user-agent information and the extracted access source IP address corresponds to any of the two sets of access source IP addresses, or (b) the extracted access source IP address corresponds to each of the two access source IP addresses and the extracted user-agent information corresponds to any of the two sets of user-agent information;
determine the user is an invalid user, based at least in part on the verification result, when: (a) the extracted user-agent information does not correspond to any of the two sets of user-agent information and the extracted access source IP address does not correspond to each of the two access source IP addresses, or (b) the extracted source IP address does not correspond to any of the two access source IP addresses and the extracted user-agent information does not correspond to each of the two sets of user-agent information;
determine the individual user is a conditionally valid user, based at least in part on the verification result, when the extracted user-agent information corresponds to each set of the two sets of user-agent information, and the extracted user IP address does not correspond to either of the stored sets of IP addresses; and
when the individual user is a conditionally valid user, request re-authentication to the individual user operating the terminal device.

2. The user validation apparatus of claim 1, wherein
the controller is further configured to execute the instructions to:
extract an access source internet protocol (IP) address from the HTTP header; and
verify whether or not the extracted access source IP address corresponds to two access source IP addresses stored in the storage unit; and
the determination includes determining that the individual user is a conditionally valid user when the extracted access source IP address corresponds to each of the two access source IP addresses and the extracted user-agent information does not correspond to any of the two sets of user-agent information.

3. The user validation apparatus of claim 1, wherein the user-agent information comprises at least one of: a version of the operating system (OS) of the terminal device, a browser of the terminal device, a number of patches of the browser of the OS and a number of updates of the browser.

* * * * *